(12) United States Patent
Ahmad et al.

(10) Patent No.: US 11,968,623 B2
(45) Date of Patent: *Apr. 23, 2024

(54) METHOD AND APPARATUS HAVING A DISCONTINUOUS RECEPTION CONFIGURATION

(71) Applicant: Lenovo (Singapore) Pte. Ltd., New Tech Park (SG)

(72) Inventors: Ziad Ahmad, Santa Clara, CA (US); Hyejung Jung, Northbrook, IL (US); Vijay Nangia, Woodridge, IL (US)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 0 days.

This patent is subject to a terminal disclaimer.

(21) Appl. No.: 17/976,165

(22) Filed: Oct. 28, 2022

(65) Prior Publication Data

US 2023/0046087 A1    Feb. 16, 2023

Related U.S. Application Data

(63) Continuation of application No. 16/740,415, filed on Jan. 11, 2020, now Pat. No. 11,503,544.

(Continued)

(51) Int. Cl.
*H04W 52/00* (2009.01)
*H04W 52/02* (2009.01)
*H04W 72/23* (2023.01)

(52) U.S. Cl.
CPC ....... *H04W 52/0229* (2013.01); *H04W 72/23* (2023.01)

(58) Field of Classification Search
CPC .......... H04W 52/0229; H04W 72/042; H04W 52/0216; H04W 76/28; H04W 72/23; H04L 5/0053; H04L 5/0091
See application file for complete search history.

(56) References Cited

U.S. PATENT DOCUMENTS

2017/0202055 A1* 7/2017 Feuersaenger .......... H04L 5/001
2019/0239189 A1* 8/2019 Hwang ............. H04W 52/0216
(Continued)

*Primary Examiner* — John D Blanton
(74) *Attorney, Agent, or Firm* — Loppnow & Chapa (57) ABSTRACT

A method and apparatus provide for receiving a discontinuous reception configuration, and receiving a configuration of a physical downlink control channel carrying a power saving downlink control information format, wherein the configuration includes an offset value with respect to a starting time of a discontinuous reception cycle of the discontinuous reception configuration. The power saving downlink control information format is detected at one of one or more monitoring occasions of the physical downlink control channel carrying the power saving downlink control information format. A determination is then made as to whether to start a drx-onDurationTimer its a following discontinuous reception cycle of the discontinuous reception configuration based on a wake-up indication of the power saving downlink control information format. The one or more monitoring occasions is determined, based upon the offset value, the starting time of the discontinuous reception cycle, and at least one search space configuration of the physical downlink control channel carrying the power saving downlink control information format.

20 Claims, 5 Drawing Sheets

Related U.S. Application Data

(60) Provisional application No. 62/791,725, filed on Jan. 11, 2019.

(56) References Cited

U.S. PATENT DOCUMENTS

| | | | |
|---|---|---|---|
| 2020/0187236 A1* | 6/2020 | Moon | H04L 5/0042 |
| 2020/0213943 A1* | 7/2020 | Medles | H04W 52/0216 |
| 2020/0229177 A1* | 7/2020 | Zou | H04L 5/001 |
| 2021/0168715 A1* | 6/2021 | Huang | H04W 24/08 |
| 2021/0176762 A1* | 6/2021 | Islam | H04W 72/1273 |
| 2021/0243680 A1* | 8/2021 | Harada | H04L 1/0072 |
| 2021/0400585 A1* | 12/2021 | Zhou | H04W 52/0229 |

* cited by examiner

METHOD AND APPARATUS HAVING A DISCONTINUOUS RECEPTION CONFIGURATION

FIELD OF THE INVENTION

The present disclosure is directed to a method and apparatus having a discontinuous reception configuration including instances in which a wake-up indication can be determined for use with at least one of one or more identified monitoring occasions.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In an effort to enhance user equipment power savings, more recent standards have looked at different forms of discontinuous reception, where different portions of a particular discontinuous reception cycle can be alternatively identified as a portion during which the user equipment will be more or less actively monitoring a control channel. During portions of the period in which the user equipment does not need to be actively monitoring the control channel, at least some of the related portions of the transceiver circuitry may be turned off, which can result is at least some power consumption reductions in the user equipment.

The present inventors have recognized that it may be possible to identify one or more monitoring occasions in a received discontinuous reception configuration during which the power saving downlink control information format can be detected. It may be further possible to determine whether to start various discontinuous reception mode timers, such as an on duration timer, based upon a wake-up indication, which can be specific to one or more user equipment forming a sub-group of the user equipment currently communicating with the network. It may be further beneficial to be able to identify particular implementation details for such a discontinuous reception mode of operation.

SUMMARY

The present application provides a method in a user equipment. The method includes receiving a discontinuous reception configuration, and receiving a configuration of a physical downlink control channel carrying a power saving downlink control information format, wherein the configuration includes an offset value with respect to a starting time of a discontinuous reception cycle of the discontinuous reception configuration. The power saving downlink control information format is detected at one of one or more monitoring occasions of the physical downlink control channel carrying the power saving downlink control information format. A determination is then made as to whether to start a drx-onDurationTimer in a following discontinuous reception cycle of the discontinuous reception configuration based on a wake-up indication of the power saving downlink control information format. The one or more monitoring occasions is determined, based upon the offset value, the starting time of the discontinuous reception cycle, and at least one search space configuration of the physical downlink control channel carrying the power saving downlink control information format.

According to another possible embodiment, a user equipment in a communication network is provided. The user equipment includes a transceiver that receives a discontinuous reception configuration, and receives a configuration of a physical downlink control channel carrying a power saving downlink control information format, wherein the configuration includes an offset value with respect to a starting time of a discontinuous reception cycle of the discontinuous reception configuration. The user equipment further includes a controller, coupled to the transceiver, that detects the power saving downlink control information format at one of one or more monitoring occasions of the physical downlink control channel carrying the power saving downlink control information format, and determines whether to start a drx-onDurationTimer in a following discontinuous reception cycle of the discontinuous reception configuration based on a wake-up indication of the power saving downlink control information format. The one or more monitoring occasions is determined, based upon the offset value, the starting time of the discontinuous reception cycle, and at least one search space configuration of the physical downlink control channel carrying the power saving downlink control information format.

These and other features, and advantages of the present application are evident from the following description of one or more preferred embodiments, with reference to the accompanying drawings.

DETAILED DESCRIPTION OF THE PREFERRED EMBODIMENT(S)

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for enhancement to discontinuous reception.

Figure 1:
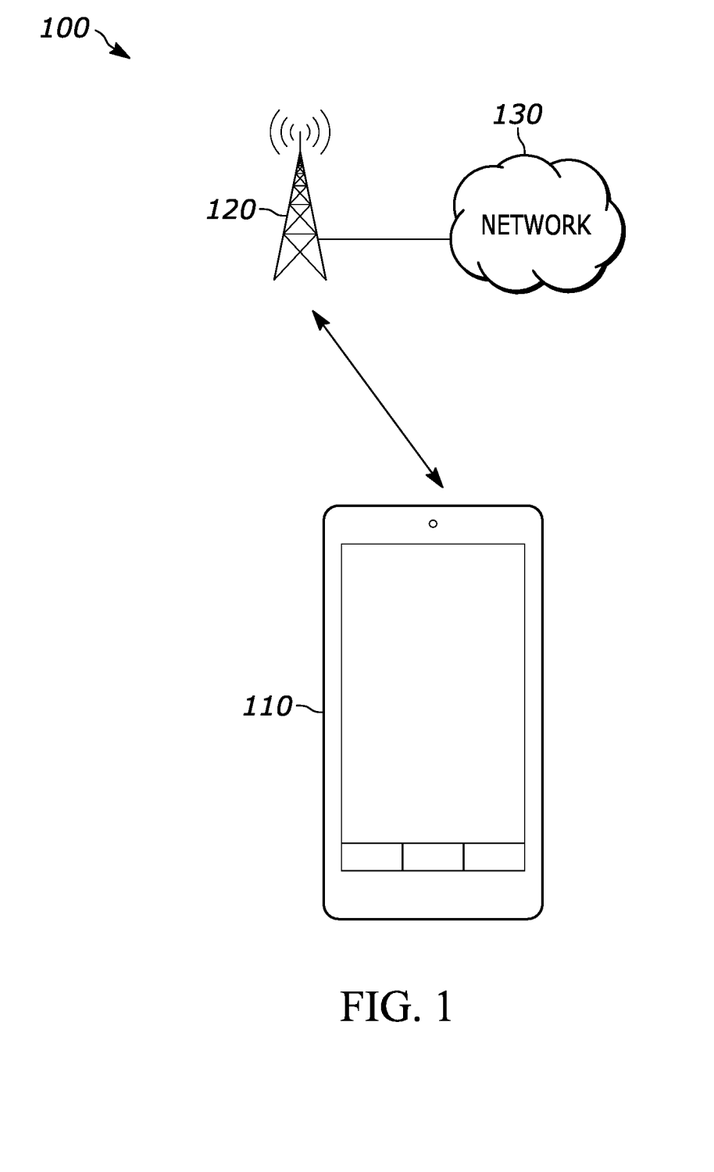
FIG. 1 is a block diagram of an exemplary network environment in which the present invention is adapted to operate.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

For Release-16 New Radio (NR), a study on UE power saving methods was initiated, and UE adaptation to data traffic in terms of frequency, time, and antenna domains is currently under discussion. In the present application, at least some consideration is given to time-domain adaptation, and more specifically, to enhancing UE power saving in connected mode discontinuous reception (C-DRX) through the introduction of Layer 1 (L1) wake-up signal/channel.

In Release-15, wake-up signals for Narrowband-Internet of Things (NB-IoT) and Machine Type Communications (MTC) were introduced for enhancing UE power saving in IDLE mode. Due to IDLE mode operation, these wake-up signals were designed to be sequence-based signals with specific resource element mapping. In C-DRX, wake-up signaling and/or information can be conveyed to user equipment (UE) over a downlink channel, such as the physical downlink control channel (PDCCH).

In the present application, methods on wake-up signaling/information transmission over PDCCH for UE power saving enhancement in discontinuous reception (DRX) are discussed.

For power saving, two discontinuous reception (DRX) modes are included in Release-15 NR, IDLE mode DRX (I-DRX) and connected mode DRX (C-DRX). During a Radio Resource Control (RRC) connected state, when no data is transmitted for a UE for a certain period of time, the UE is instructed, by network command or configuration, to enter DRX. A C-DRX cycle is divided into two durations, an ON duration and an OFF duration. The UE is only required to perform PDCCH monitoring during the ON duration. In some cases, the ON duration can be extended when a downlink (DL) transmission grant arrives towards the end of the ON duration where the UE continues monitoring PDCCH until the expiry of an inactivity timer. C-DRX operation parameters can be configured from higher layers through an RRC message. Some controls over C-DRX operation can be carried out by the network through MAC Control Element (CE) commands for faster adaptation.

C-DRX allows the UE to save power by not monitoring PDCCH in the OFF duration. However, in some cases, for a specific DRX configuration and a specific data traffic rate, the UE may find itself waking up for PDCCH monitoring in an ON duration where no packets are actually scheduled. In such scenarios, and to allow for faster and smaller scale power savings in the time-domain, having the UE monitor a Layer 1 (L1) wake-up signal that indicates whether or not the UE should wake up for monitoring PDCCH in an ON duration can further enhance power savings.

In Release-15 NR, wake-up signals for Narrowband IoT (NB-IoT) and Machine Type Communications (MTC) were introduced for enhancing UE power saving in IDLE mode. Due to IDLE mode operation, these wake-up signals were designed to be sequence-based with specific resource element mapping. In C-DRX, wake-up signaling and/or information can be conveyed to the user equipment (UE) as part of Downlink Control Information (DCI) over PDCCH.

Monitoring a wake-up signal/channel at a slower timescale (e.g., periodically), even if transmitted over PDCCH, would consume less power, as the UE does not have to fully wake-up and be ready for other tasks such as physical downlink shared channel (PDSCH) decoding or sending physical uplink control channel (PUCCH) responses between the wake-up signal/channel occasions. The advantages of using PDCCH compared to sequence-based signaling is that it may reduce overhead by reusing control resources, while sequence-based signaling may require a separate resource element allocation. In addition, sequence-based signal detection can have a higher detection error rate compared to DCI, as error-control coding is performed on DCI. Further, using PDCCH may allow for less modification to the specification of Release-15 NR.

As part of the effort in 3GPP for enhancing UE power savings for Release-16 NR, PDCCH/DCI-based wake-up/ go-to-sleep signal were proposed. However, the proposals generally lack details concerning much of the specifics for such a design such as the configuration, adaptation, DCI format, and design of the wake-up signal/channel, as well as whether it is UE-specific or group based. The present application provides at least a couple of embodiments, which are intended to provide at least some specifics concerning how the PDCCH/DCI-based wake-up signal/channel could be integrated.

In terms of the configuration of the wake-up signal/ channel in C-DRX, this can be controlled by upper layer signaling such as through an RRC message. Some configuration parameters, such as wake-up signal/channel periodicity, might need to be adapted by upper-layers more frequently, and in at least some instances this might be accomplished through a medium access control control element (MAC CE) command. After the wake-up signal/ channel is configured, the wake-up signal/channel can be transmitted as part of a DCI over PDCCH. Below, at least a couple of embodiments are described concerning how the wake-up signal/channel could be configured and how it could be designed and mapped to a DCI. Background on DRX configuration, through RRC and MAC CE, and on DCI formats as described in Release-15 NR are also briefly discussed.

DRX Configuration

The PDCCH monitoring activity of the UE in RRC connected mode is governed by at least DRX.

When DRX is configured, the UE does not have to continuously monitor PDCCH. DRX is characterized by the following:

on-duration: duration that the UE waits for, after waking up, to receive PDCCHs. If the UE successfully decodes a PDCCH, the UE stays awake and starts the inactivity timer;

inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions);

retransmission-timer: duration until a retransmission can be expected;

cycle: specifies the periodic repetition of the on-duration followed by a possible period of inactivity (see figure below);

active-time: total duration that the UE monitors PDCCH. This includes the "on-duration" of the DRX cycle, the time the UE is performing continuous reception while the inactivity timer has not expired, and the time when the UE is performing continuous reception while waiting for a retransmission opportunity.

Figure 2:
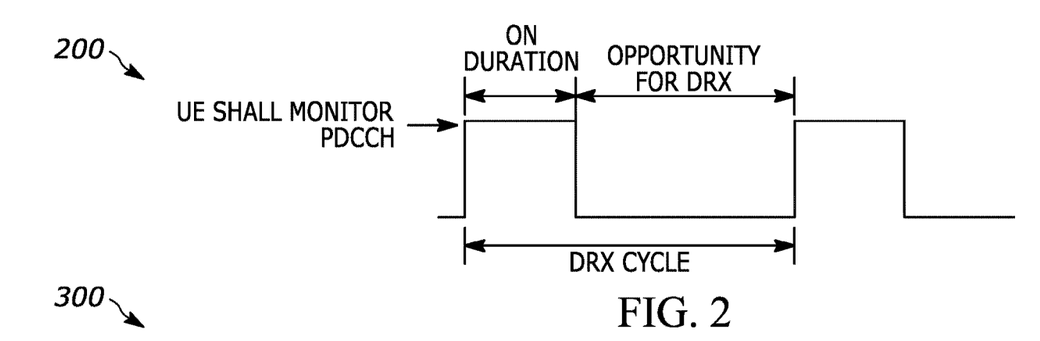
FIG. 2 is a waveform diagram of an exemplary discontinuous reception cycle, such as for monitoring a physical downlink control channel.

FIG. 2 provides a waveform diagram 200 of an exemplary discontinuous reception cycle, such as for a physical downlink control channel.

RRC DRX Configuration

DRX can be configured through a specific RRC information element (IE) called DRX-Config. According to Release-15 NR, the DRX parameters that can be configured within DRX-Config include the following:

drx-onDurationTimer: the duration at the beginning of a DRX Cycle;

drx-SlotOffset: the delay before starting the drx-onDurationTimer;

drx-InactivityTimer: the duration after the PDCCH occasion in which a PDCCH indicates a new uplink (UL) or downlink (DL) transmission for the MAC entity;

drx-RetransmissionTimerDL (per DL hybrid automatic repeat request (HARQ) process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX Cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process): the minimum duration before a DL assignment for HARQ retransmission is expected by the medium access control (MAC) entity;

drx-HARQ-RTT-TimerUL (per UL HARQ process): the minimum duration before a UL HARQ retransmission grant is expected by the MAC entity.

When a DRX cycle is configured, the Active Time includes the time while:

drx-onDurationTimer or drx-InactivityTimer or drx-RetransmissionTimerDL or drx-RetransmissionTimerUL or ra-ContentionResolutionTimer is running; or a Scheduling Request is sent on a physical uplink control channel (PUCCH) and is pending; or a PDCCH indicating a new transmission addressed to the Cell Radio Network Temporary Identifier (C-RNTI) of the MAC entity has not been received after successful reception of a Random Access Response for the Random Access Preamble not selected by the MAC entity among the contention-based Random Access Preamble.

MAC CE DRX Command

DRX Command MAC CE and Long DRX Command MAC CE can be identified by a MAC Protocol Data Unit (PDU) subheader with a specific Logical Channel ID (LCID). When a DRX Command MAC CE or a Long DRX Command MAC CE is received, drx-onDurationTimer and drx-InactivityTimer are stopped. If the Short DRX cycle is configured and a DRX Command MAC CE is received, drx-ShortCycle Timer are started or restarted in the first symbol after the end of DRX Command MAC CE reception and the Short DRX Cycle is used, else the Long DRX cycle is used. If a Long DRX Command MAC CE is received, the Long DRX cycle is used.

DCI Formats

The DCI formats defined in Release-15 NR are:

Format 0_0: Scheduling of PUSCH in one cell.
Format 0_1: Scheduling of PUSCH in one cell.
Format 1_0: Scheduling of PDSCH in one cell.
Format 1_1: Scheduling of PDSCH in one cell.
Format 2_0: Notifying a group of UEs of the slot format.
Format 2_1: Notifying a group of UEs of the PRB(s) and OFDM symbol(s) where UE may assume no transmission is intended for the UE
Format 2_2: Transmission of TPC commands for PUCCH and PUSCH.
Format 2_3: Transmission of a group of TPC commands for SRS transmissions by one or more UEs.

DCI formats 1_0, 2_1, 2_2, 2_3 monitored in the common search space of a serving cell have the same DCI size.

According to a possible embodiment, in order to allow for further UE power savings in DRX, a wake-up signal/channel can be used for indicating to the UE (e.g., via UE-specific signaling) or a group of UEs (e.g., via group-specific signaling) when to wake-up for PDCCH monitoring in an ON duration. The wake-up signal/channel could be transmitted over PDCCH as part of a DCI. For monitoring the wake-up signal/channel over PDCCH, the UE does not have to fully wake-up to be ready for performing other tasks such as PDSCH decoding or PUCCH response transmission, which could be the case for PDCCH monitoring in an ON duration. As opposed to introducing a new separate signal for wake-up indication, using PDCCH for wake-up signal/channel would add no overhead and would require less modifications to the specifications of Release-15 NR. In addition, error-control coding is performed on DCI allowing for better detection of the wake-up signal/channel. Also, using PDCCH for wake-up signal/channel allows additional power saving related control information to be conveyed in the PDCCH payload as compared to a pure sequence based wake-up signal design.

Figure 3:
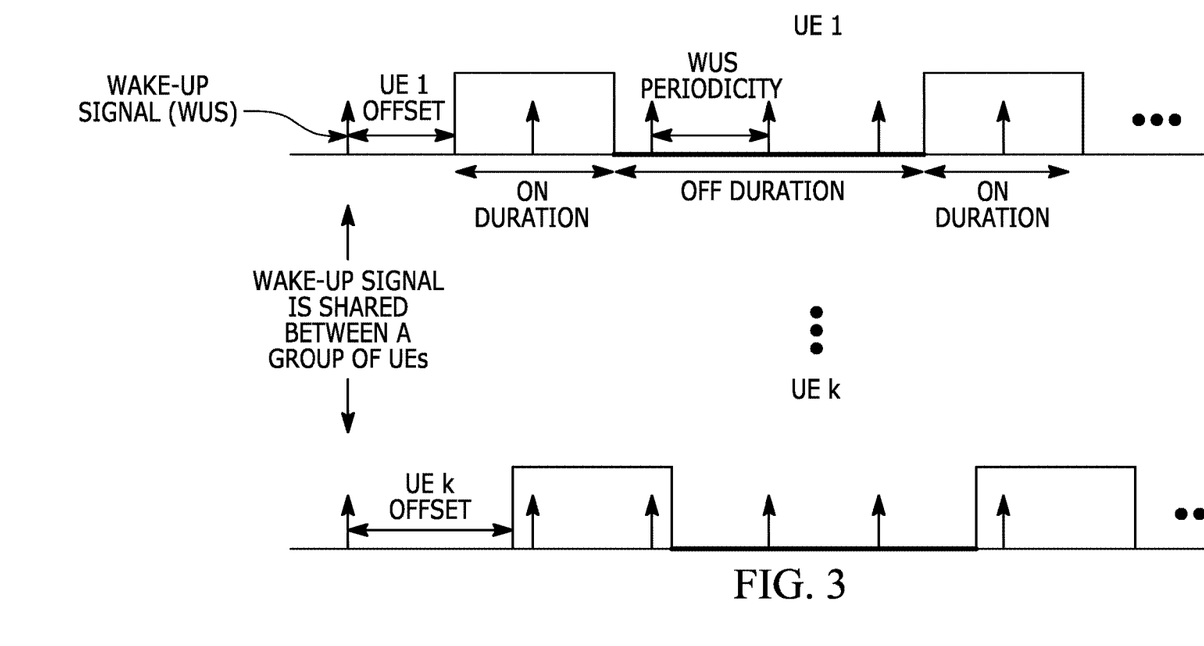
FIG. 3 are exemplary waveform diagrams for a group of k user equipment, which can share a wake up signal/channel for power saving enhancements as part of the discontinuous reception mode.

In our proposed solution, the wake-up signal/channel can be transmitted as part of DCI over PDCCH in the common search space of PDCCH. In addition to the lower-complexity of blind decoding of PDCCH in the common search space (e.g., smaller number of blind decodes), using the common search space allows for using the same wake-up signal/channel for a group of UEs, which can allow for overhead reduction. Typically, the UEs in such a group would be sharing a similar DRX configuration, e.g., at least with respect to the same or within a certain value range of drx-SlotOffset (start of DRX ON duration). At least one exemplary proposed solution is shown in FIG. 3, where FIG. 3 includes exemplary waveform diagrams 300 for a group of k user equipment, which can share a wake up signal/channel for power saving enhancements as part of the discontinuous reception mode. The wake-up signal/channel can also be transmitted as part of a DCI in a UE-specific search space. Using a UE-specific search space would allow for a UE-specific or dedicated wake-up signal/channel that can be configured with UE-specific parameters.

The details of wake-up signal/channel configuration in Embodiment 1 are further discussed, as well as the adaptation of wake-up signal/channel operation in Embodiment 2, specific DCI format for wake-up signal/channel in Embodiment 3, and wake-up signal/channel design as part of PDCCH/DCI in Embodiment 4.

Embodiment 1: Configuration of Wake-Up Signal/Channel and DRX

In one embodiment, a UE receives via higher-layer signaling a wake-up signal/channel configuration which can include a monitoring periodicity, a monitoring occasion duration (e.g. in terms of the number of symbols and a starting symbol index, or a bitmap indicating a set of symbols within a slot), and a monitoring occasion time offset (e.g. in terms of a slot index or a subframe index). If the UE is configured with DRX operation, the UE may determine and receive the closest wake-up signal/channel to the start time of ON duration of a given DRX cycle and monitor the wake-up signal/channel during the configured DRX ON duration.

In another embodiment, a UE can determine (e.g., implicitly) the configuration of a wake-up signal/channel based on DRX configuration, if the UE is configured to monitor the wake-up signal/channel. For example, in at least some instances, the UE can assume that the monitoring periodicity of the wake-up signal/channel is the same as (or multiple of, or a fraction of) a configured DRX cycle, and the monitoring occasion of the wake-up signal/channel can be determined based on the start of DRX ON duration (e.g. the first [X] symbols of the ON duration, the first [X] symbols of slot n-k, k slots prior to the slot n corresponding to the start of the ON duration, k can be a single value or multiple values corresponding to single slot or multiple slot hypothesis/blind detection for receiving the wake up signal/channel).

In one embodiment, a DRX configuration can include an offset value of the start of the ON duration with respect to the start of a DRX cycle. In one example, a UE may assume that wake-up signal/channel is transmitted at the beginning of the DRX cycle. A network entity may configure and transmit a wake-up signal/channel for a group of UEs which can be configured with the same DRX cycle and the same cycle start offset. The group of UEs may have same or different start time of ON duration within the configured DRX cycle window. This allows the wake-up signal/channels to be shared among the group of UEs. However, control and/or data channel transmission windows may be different among the group of UEs so that the network entity can distribute the multiple UEs' traffics across different time windows and the UE can wake-up only for the configured transmission window.

In one embodiment, a group of UEs may have a same or a different start time of ON duration with the same wake-up signal/channels shared among the group of UEs. However, control and/or data channel transmission windows (e.g., different start time of ON duration, and/or different ON duration drx-onDurationTimer values) may be different among the group of UEs so that the network entity can distribute the multiple UEs' load/traffic across different time windows and the UE can wake-up only for the configured transmission window.

In another embodiment, a UE can receive an indication of an offset value of the wake-up signal/channel monitoring occasion with respect to the start of a DRX cycle or start of the ON duration. In this case, a group of UEs configured to monitor the same wake-up signal/channel may be configured with same or different DRX configurations (e.g., a DRX cycle, DRX slot offset, DRX cycle start offset).

In other embodiments, a UE dynamically receives an indication of a start time of an ON duration within a configured DRX cycle window (determined by e.g., the DRX cycle DRX slot offset, and/or a cycle start offset) in a wake-up signal/channel. Alternatively, the UE receives dynamic indication of a start time offset of an ON duration with respect to the received wake-up signal/channel in the wake-up signal/channel. In another example, the dynamic indication may further indicate the ON duration drx-onDurationTimer value. Dynamic indication can sometimes provide more fairness in terms of UE power saving impact among the group of UEs sharing the same wake-up signal/channel. In one example, the dynamic indication may be only valid for the DRX cycle associated with the wake-up signal/channel.

In one embodiment, the UE can monitor the wake-up signal/channel monitoring occasion only during the ON duration of the DRX cycle. In another example, in addition to the ON duration, the UE may also monitor the wake-up signal/channel during a monitoring occasion prior to the start (e.g., closest to the start of an ON duration or the indicated offset as described above) of the ON duration. If the wake-up signal/channel indicates the UE is not required to wake-up (i.e., can sleep for power savings), then the UE can wake up at the next wake-up signal/channel monitoring occasion within the ON duration. In one example, the wake-up signal/channel may indicate to skip (i.e., to not perform continuous reception and PDCCH monitoring activity) the next [X] or remaining monitoring occasions within the ON duration.

Embodiment 2: Adaptation of Wake-Up Signal/Channel and DRX

In one embodiment, a UE can be configured with a set of wake-up signal/channel monitoring periodicity values via higher layer e.g., RRC signaling, and a MAC CE based command can indicate a selected wake-up signal/channel monitoring periodicity.

In another embodiment, in DRX configuration, a UE can be configured with a set of DRX cycle values and/or DRX ON duration timer values via RRC signaling, and a MAC CE based command can indicate a selected DRX cycle value and/or DRX ON duration timer value.

In another embodiment, a UE can receive a dynamic indication of a DRX ON duration timer value, e.g. in a wake-up signal/channel.

In other embodiments, a UE can dynamically receive an indication of skipping the next [X] wake-up signal/channel monitoring occasions (via MAC CE in PDSCH or via DCI within a PDCCH based wake-up channel).

Embodiment 3: Wake-Up Signal/Channel DCI Format

In addition to the DCI formats defined in Release-15 NR, a new wake-up DCI format can be added for the wake-up signal/channel. The length of the DCI, in terms of total number of information bits, can be same as that for other formats, such as formats 2_0, or 1_0/2_1/2_2/2_3 of Release-15 NR to reduce any additional blind decoding DCI sizes. In one example, the wake-up DCI format may share blind decoding with other formats. The number of blind decoding candidates for the wake-up DCI format may be configured by higher layers. In the DCI of a group common PDCCH, the number of wake-up signal/channel bits intended for each UE can be designed such that the total number of bits for the group of UEs does not exceed the DCI format length. A new radio network temporary identifier (RNTI), e.g., wake up channel (WUC)-RNTI, can be defined to scramble the CRC of the wake-up signal/channel DCI, so that the UE can determine the DCI corresponding to the wake-up signal/channel. In one example, the wake-up DCI can be received in the common search space or UE-specific search space. A wake-up DCI in the common search space may be common for a group of UEs.

Embodiment 4: PDCCH Based Wake-Up Channel

The design of the wake-up signal/channel in terms of bit fields could include an indication of whether the UE should wake up or not, and can include other indications, such as partial or complete start time-offset information, DRX ON duration timer value, DRX cycle start offset or monitoring duration. The indications may be separately coded or jointly coded. The number of bits a UE is assigned per wake-up signal/channel could be limited to a small number of bits, for example no more than 3 bits. In one example, the wake-up DCI may include multiple sets of 2 bit fields, with a bit field assigned to a UE or group of UEs. Mapping from the bit sequence to a combination of wake-up indications and/or other parameters such as the time-offset, wake-up duration, and/or wake-up channel periodicity can be defined and configured for the UE.

In DCI of a group common PDCCH, in one example, each UE have a 2-bit field, where '00' can indicate no wake-up, and '01', '10', and '11' can indicate 3 different values of a start time offset of ON duration with respect to the wake-up channel.

In another example, each UE can have a 2-bit field, where '00' indicates no wake-up, and '01', '10', and '11' can indicate 3 different values of PDCCH monitoring duration after the wake-up signal/channel is received. For example, '00' can indicate no wake-up, '01' can indicate that the PDCCH monitoring duration (i.e. ON duration) is equal to the wake-up channel periodicity, '10' can indicate that the PDCCH monitoring duration is half that of the monitoring periodicity, and '11' can indicate that the PDCCH monitoring duration is quarter of that of the monitoring periodicity. In another example, the monitoring duration can be a multiple times more than the periodicity instead of a factor times less.

Another example would be to have more than 2 bits for each UE, such as having 4 bits per UE to indicate both a start time-offset of ON duration and a PDCCH monitoring duration (i.e. ON duration). For example, '0000' can be used to indicate no wake-up, the remaining 15 bit combinations can be used to indicate 5 time-offsets and 3 wake-up durations (i.e. ON durations).

Embodiment 5: Discovery Reference Signal Transmission for NR Access to Unlicensed Spectrum (NR-U)

During RAN1#94bis and RAN1#95 meeting, RAN1 made the following agreements for Discovery Reference Signal (DRS) design including SS/PBCH block (SSB) transmission and multiplexing of SSB and CORESET#0:
For SSB transmissions as part of DRS:
  It is considered beneficial to expand the maximum number of candidate SSB positions within DRS transmission window to [Y], for e.g., Y=[64]
    For future study (FFS): How to derive frame timing from detected SS/PBCH block
  Transmitted SSBs do not overlap
    FFS: Shift granularity between candidate SSBs positions/candidate groups of SSBs
    Maximum number of transmitted SSBs is [X] within DRS transmission window. X<=8
    FFS: Duration of DRS transmission window
    FFS: Duration of the transmitted DRS within the window, including SSBs and other multiplexed signals/channels
  S: relationship between transmitted SSB index and Quasi-Co-Location (QCL) assumption at UE
  FFS: If and how to support beam repetition for soft combining of SSBs within the same DRS transmission
  It is considered beneficial to configure DMTC(s) (DRS Measurement Time Configuration) in which UEs can perform measurements.
  DRS-based Radio Resource Management (RRM) measurements are performed inside the DMTC(s)
    FFS: Similarity with Rel-15 SMTC
    CSI-RS-based measurements may be performed outside the DMTC(s)
  DRS-based Radio Link Monitoring (RLM) for unlicensed SpCell is performed inside the DMTC(s)
    RLM DMTC may coincide with DRS transmission window
    CSI-RS-based RLM may be performed outside of DMTC(s)
  FFS: Explicit indication is provided by gNB to indicate whether or not DRS and/or CSI-RS transmissions occurred
  FFS: If DMTCs for RRM measurements and RLM are the same or can be different
  Confirm the working assumption: Extended CP for SS/PBCH block is not supported for NR-U operation
  Modify the section in the Technical Report (TR) to remove references to future confirmation of this statement.
  Support of Pattern 1 is recommended for multiplexing of SS/PBCH block(s) and CORESET(s)#0 in NR-U.
    As one element to facilitate a NR-U DRS design without gaps in the time domain, the CORESET#0 configuration(s) and/or Type0-PDCCH common search space configuration(s) may need enhancements compared to NR Rel-15, such as additional time domain configurations of the common search space.
  Note: Pattern 1 is understood as CORESET#0 and SS/PBCH block(s) occur in different time instances, and CORESET#0 bandwidth overlaps with the transmission bandwidth of the SS/PBCH block.
  Adopt the following text proposal to reflect the above
    "Support of Pattern 1 is recommended for multiplexing of SS/PBCH block(s) and CORESET(s)#0 in NR-U, where Pattern 1 is understood as CORESET#0 and SS/PBCH block occur in different time instances, and CORESET#0 bandwidth overlaps with the transmission bandwidth of the SS/PBCH block.
    As one element to facilitate a NR-U DRS design without gaps in the time domain, the CORESET#0 configuration(s) and/or Type0-PDCCH common search space configuration(s) may need enhancements compared to NR Rel-15, such as additional time domain configurations of the common search space."

Adopt the following text for the TR:

The detection of a gNB's transmission burst by the UE has been studied, and concerns on the UE power consumption required for transmit (Tx) burst detection e.g. if the UE needs to frequently detect/monitor the PDCCH have been raised. The proposals that have been made by contributions regarding these topics include existing NR signal(s) with potential enhancement(s), a channel such as PDCCH with potential enhancement(s), and the 802.11a/802.11ax preamble with potential enhancement(s); consensus was not achieved on any of these proposals. The detection/decoding reliability of each of the proposals has not been sufficiently evaluated for a complete evaluation of the proposals against each other. The power consumption and detection/decoding complexity of each of the proposals have not been sufficiently evaluated for a complete evaluation of the proposals against each other. The relation of a proposal with C-DRX and/or measurement gap(s) may need further consideration when specifications are being developed.

The present application can additionally provide Discovery Reference Signal (DRS) design and related procedure for NR access to unlicensed spectrum.

DRS for NR-U can include at least a SS/PBCH block burst, and CSI-RS may be transmitted outside a DRS transmission window.

SS/PBCH Block Burst Transmission
Subcarrier Spacing (SCS)

According to NR-U WID (RP-182878), the work item will specify NR enhancements for a single global solution framework for access to unlicensed spectrum which enables operation of NR in the 5 GHz and the 6 GHz (e.g., US 5925-7125 MHz, or European 5925-6425 MHz, or parts thereof) unlicensed bands taking into account regional regulatory requirements. In 3GPP Rel-15 NR, SS/PBCH (SSB) are transmitted with either 15 KHz SCS or 30 KHz SCS in FR1. Thus, in Rel-16 NR-U, the allowed SSB subcarrier spacing should be 30 KHz only or both 15 KHz and 30 KHz. If two values are allowed, RAN4 can define a region-specific and unlicensed-band specific SSB subcarrier spacing value to avoid UE's blind detection for SSB subcarrier spacing.

In one example, namely Rel-16 NR-U, the allowed SCS for SS/PBCH block transmission should be 1) 30 KHz only or 2) both 15 KHz and 30 KHz. If two values are allowed, RAN4 defines a region-specific and unlicensed-band specific SS/PBCH subcarrier spacing value.

Max Number of SSBs within a SSB Burst

According to Rel-15 NR (relevant spec text copied below), for 15 KHz SCS and frequency range of 3-6 GHz, the max 8 SSBs can be transmitted within a SSB burst. Further, for 30 KHz SCS and frequency range of 3-6 GHz (or 2.4-6 GHz for SSB burst pattern Case C in TDD), the max 8 SSBs can be transmitted within a SSB burst. Thus, Rel-16 NR-U spec should allow the max 8 SSB transmissions within a DRS transmission window.

From the endorsed editor's CR for TS 38.213 (R1-1814394)-

For a half frame with SS/PBCH blocks, the first symbol indexes for candidate SS/PBCH blocks are determined according to the SCS of SS/PBCH blocks as follows, where index 0 corresponds to the first symbol of the first slot in a half-frame.

Case A—15 kHz SCS: the first symbols of the candidate SS/PBCH blocks have indexes of $\{2,8\}+14 \cdot n$. For carrier frequencies smaller than or equal to 3 GHz, n=0,1. For carrier frequencies larger than 3 GHz and smaller than or equal to 6 GHz, n=0,1, 2, 3.

Case B—30 kHz SCS: the first symbols of the candidate SS/PBCH blocks have indexes $\{4,8,16,20\}+28 \cdot n$. For carrier frequencies smaller than or equal to 3 GHz, n=0. For carrier frequencies larger than 3 GHz and smaller than or equal to 6 GHz, n=0,1.

Case C—30 kHz SCS: the first symbols of the candidate SS/PBCH blocks have indexes $\{2,8\}+14 \cdot n$. For carrier frequencies smaller than or equal to 3 GHz, n=0, 1. For carrier frequencies larger than 3 GHz and smaller than or equal to 6 GHz, n=0,1, 2, 3.

For paired spectrum operation
  For carrier frequencies smaller than or equal to 3 GHz, n=0, 1. For carrier frequencies larger than 3 GHz and smaller than or equal to 6 GHz, n=0, 1, 2, 3.

For unpaired spectrum operation
  For carrier frequencies smaller than or equal to 2.4 GHz, n=0, 1. For carrier frequencies larger than 2.4 GHz and smaller than or equal to 6 GHz, n=0,1, 2, 3.

In one example, Rel-16 NR-U supports the maximum 8 SSB transmissions within a DRS transmission window.

SSB Burst Transmission Pattern

In an unlicensed band, a network entity (e.g. gNB) should be able to transmit DRS quickly within a channel occupancy time (COT). Thus, it is desirable that the max. 8 SSBs of a SSB burst are transmitted on consecutive SSB candidate positions. A starting SSB candidate position of the SSB burst may be flexibly selected from [64] SSB candidate positions of a DRS transmission window subject to gNB's Listen-Before-Talk (LBT), with the entire SSB burst being transmitted within the 64 SSB candidate positions (i.e. within the DRS transmission window).

Definition of SSB candidate positions for Rel-16 NR-U can be based on Case A, Case B, and Case C of Rel-15 NR SSB candidate position specification (please refer to the copied spec text above). Case B in Rel-15 NR was specified to address the deployment scenario that an NR cell and a LTE cell are deployed in the same carrier. In 5 GHz and 6 GHz unlicensed spectrum, it is possible that legacy LTE-LAA cells may coexist with Rel-16 NR-U cell, where Case B SSB candidate positions may be used. Assuming 64 SSB candidate positions within a DRS transmission window and Rel-15 NR Case A/B/C based SSB candidate position extension up to 64 SSB candidate positions, the minimum required DRS transmission window duration would be 32 ms for 15 KHz SCS SSB and 16 ms for 30 KHz SCS SSB.

In one embodiment, SS/PBCH blocks of a SSB burst are transmitted on consecutive SSB candidate positions within a DRS transmission window. For example, the max. 8 SSBs of a SSB burst are transmitted on consecutive SSB candidate positions.

In one example, the starting SSB candidate position of the SSB burst is flexibly selected from 64 SSB candidate positions of a DRS transmission window subject to LBT with the entire SSB burst being transmitted within the 64 SSB candidate positions.

In one example, 64 SSB candidate positions within a DRS transmission window are determined by consecutively repeating Rel-15 NR Case A/B/C based SSB candidate positions up to 64 SSB candidate positions.

In one example, Rel-16 NR-U supports DRS transmission window duration of 32 ms for 15 KHz SCS SSB and of 16 ms for 30 KHz SCS SSB.

Frame Timing and Quasi-Co-Location (QCL)

If transmitted SSBs in Rel-16 NR-U DRS are indexed according to the SSB candidate position indices as in Rel-15 NR and the starting SSB candidate position of the SSB burst is changing subject to LBT, UE cannot assume QCL among SSBs which have the same SSB index but are transmitted in different DRS transmission windows. If the first transmitted SSB of the SSB burst is set as the SSB index 0, UE can assume that detected SSBs with the same SSB index but from different DRS is transmission windows are spatially quasi-co-located. With the max. 8 SSBs within a SSB burst, one of SSB index values {0, 1, . . . , 7} can be indicated via selection of a PBCH DM RS sequence (i.e. the DM RS sequence generator is initialized at the start of each SSB occasion based on the SSB index). This allows UE to perform DRS based mobility measurements and reporting by only detecting PSS/SSS and PBCH DMRS without decoding PBCH in RRC connected mode.

According to TS 38.212, Rel-15 NR PBCH includes 3 bits used for the three most significant bits of the SSB candidate position index (if there are 64 SSB candidate positions) and 1 bit indicating half frame timing information. In Rel-16 NR-U, these 4 PBCH payload bits can be used for indicating the time location of the transmitted SSB within the DRS transmission window in terms of 2 slot granularity. Assuming that the start of the DRS transmission window is aligned with the frame boundary, by decoding PBCH, the UE can identify the SFN (from the SFN payload bits in MIB/PBCH) and obtain partial frame timing information with up to 2-slot timing ambiguity. If gNB transmits 2 bits in System Information Block 1 (SIB1) to indicate a time shift value of the SSB burst within 2 slots, the UE can obtain the exact SSB transmission location of the detected SSB within 2 slots and determine the frame boundary. Note that the 2-bit indication value in SIB1 is same for all transmitted SSBs and accordingly, the SIB payload does not change across SSBs of the SSB burst. This allows the UE to combine SIB1 PDSCHs associated with multiple SSBs for improved demodulation performance.

In one embodiment, the first transmitted SSB of the SSB burst in the DRS transmission window can be set as the SSB index 0. For example, the SSB index from {0, 1, . . . , 7} for the max 8 SSBs of the SSB burst is indicated via selection of a PBCH DMRS sequence.

In one embodiment, the UE can determine frame boundary information by decoding PBCH and SIB1. The existing 4 bits in the Rel-15 NR PBCH payload can be used for indicating the time location of the transmitted SSB within the DRS transmission window in terms of 2 slot granularity. Further, gNB can use 2 bit in SIB1 to indicate a time shift value of the SSB burst within 2 slots in terms of the number of SSB candidate positions. Alternatively, gNB can use 1 bit in SIB1 to indicate whether the slot where the SSB is transmitted has an even or odd number for the slot index (in this case, the first SSB of the SSB burst is always transmitted in the first SSB position of a slot).

In the present application, a DCI-based wake-up signal/channel in C-DRX is proposed for UE power saving enhancement. The UE can use the wake-up signal/channel to skip monitoring PDCCH in an ON duration where transmission grants are not expected. For monitoring the wake-up signal/channel over PDCCH, the UE does not have to fully wake up for PDSCH decoding or PUCCH response transmission as would be the case for regular PDCCH monitoring in an ON duration. The use of PDCCH for wake-up signal/channel transmission, as opposed to introducing a new sequence-based wake-up signal, would add less overhead, as a sequence-based design would require reserving specific resource elements. In addition, error-control coding is performed on DCI which allows for more robust detection of the wake-up signal/channel. Lastly, using PDCCH for wake-up signal/channel transmission could provide relatively little modifications to the specification of Release-15 NR.

Some of the interesting features lie in the details of the wake-up signal/channel in terms of its configuration, monitoring assumptions, adaptation of parameters, DCI format, and design. In terms of configuration, this includes parameters such as the periodicity of the wake-up signal/channel, the monitoring duration, and the time offset between the wake-up signal/channel and the start of the next ON duration. These parameters can be configured by upper layers through an RRC message. For faster adaptation of configuration parameters, such as periodicity, it is proposed that some parameters can be indicated by a MAC CE command.

It is further proposed, that the wake-up signal/channel is either common to a group of UEs or is UE-specific. For common DCI for a group of UEs, that typically share similar DRX configurations, the start slot index of the ON duration may be different for each UE. For this reason, the wake-up signal/channel configuration parameters can include a time-offset parameter, possibly in terms of a number of slots or subframes, to indicate to the UE the offset of the wake-up signal/channel with respect to the start of the next ON duration (i.e. the start of the next DRX cycle). The time-offset can allow for the UE to determine when to wake-up and monitor the wake-up signal/channel and avoid/minimize blind decoding of the wake-up signal/channel time location. In another solution, the time-offset information, at least partially, can be incorporated as part of the wake-up signal/channel DCI.

To avoid monitoring the wake-up signal/channel in the OFF duration, the UE may monitor the wake-up signal/channel closest to the start of the ON duration and continue monitoring the wake-up signal/channel within the ON duration. Note that the wake-up duration may be a factor smaller or a multiple times larger than the wake-up signal/channel periodicity.

A new DCI format specifically for the wake-up signal/channel is introduced that could be of similar length in terms of bits to DCI formats already defined in Release-15 NR such as formats 2_0, 2_1, or 2_2. A specific RNTI could be introduced so that the UE can determine that the DCI corresponds to a wake-up signal/channel. Scrambling can be used to determine whether the wake-up signal/channel is in the common search space or the UE-specific search space.

The design of the wake-up signal/channel in terms of bit fields could include an indication of whether the UE should wake up or not, and can include other indications, such as partial or complete time-offset information or monitoring duration. The number of bits per wake-up signal/channel per the UE could be limited to a small number of bits, for example, no more than 4 bits.

Figure 4:
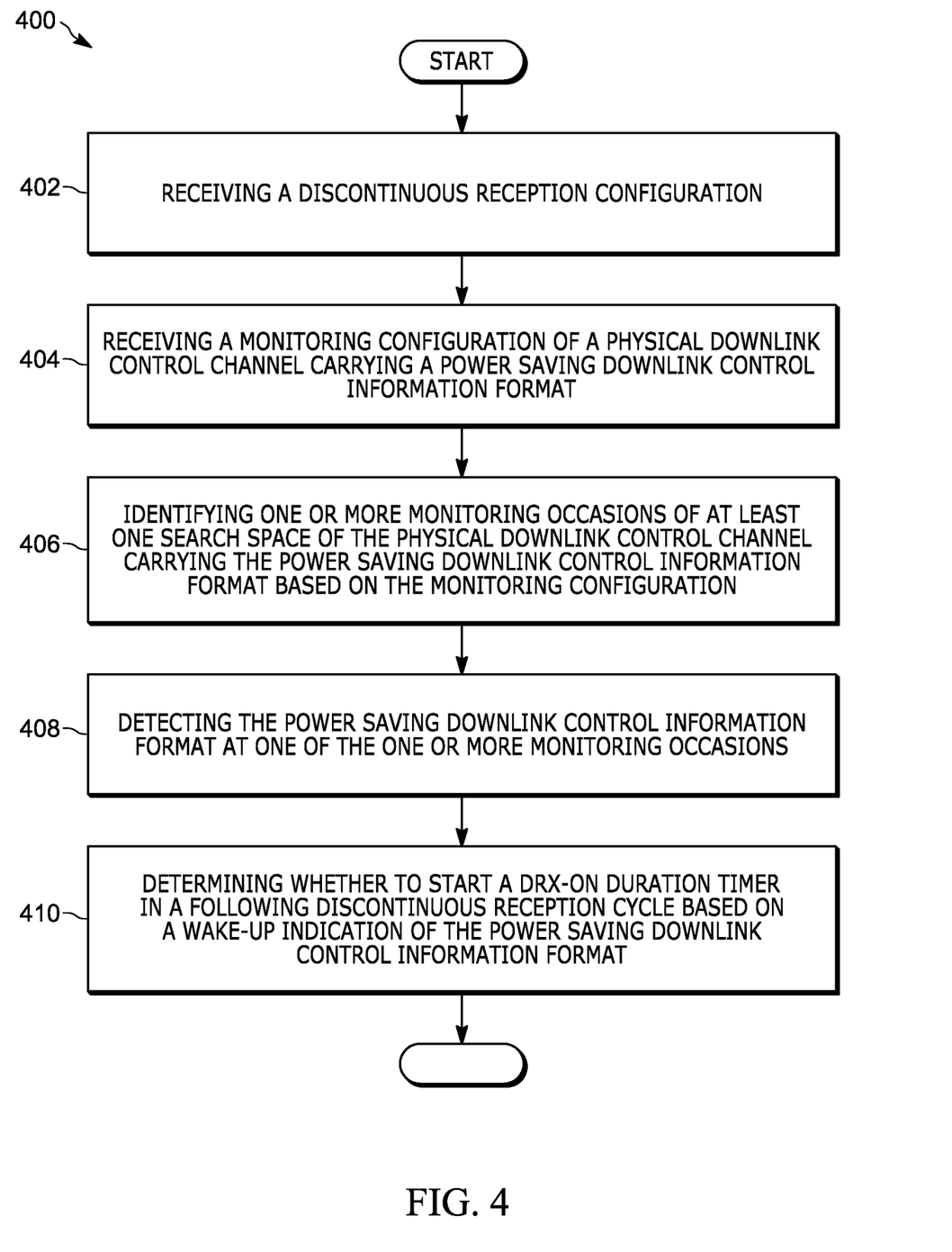
FIG. 4 is a flow diagram in a user equipment for receiving a discontinuous reception configuration for use in monitoring a physical downlink control channel.

FIG. 4 illustrates a flow diagram 400 in a user equipment for receiving a discontinuous reception configuration for use in monitoring a physical downlink control channel. More specifically, the flow diagram includes receiving 402 a discontinuous reception configuration, and receiving 404 a monitoring configuration of a physical downlink control channel carrying a power saving downlink control information format. One or more monitoring occasions of at least one search space of the physical downlink control channel carrying the power saving downlink control information format based on the monitoring configuration is identified 406. The power saving downlink control information format is detected 408 at one of the one or more monitoring occasions. A determination 410 is then made as to whether to start a drx-onDurationTimer in a following discontinuous reception cycle based on a wake-up indication of the power saving downlink control information format.

In some instances, receiving the monitoring configuration can include receiving at least one search space configuration. In some of these instances, a search space configuration of the at least one search space configuration can include information of a physical downlink control channel monitoring periodicity, a physical downlink control channel monitoring offset, and one or more physical downlink control channel monitoring symbols within a slot.

In some instances, the at least one search space can be a common search space, which is common to more than one user equipment.

In some instances, receiving the monitoring configuration can include receiving an indication of an offset value with respect to a starting time of a discontinuous reception cycle. In some of these instances, the offset value can correspond to a number of slots. In some instances, the offset value can be user equipment-specifically indicated.

In some instances, the one or more monitoring occasions of the at least one search space can be within one slot.

In some instances, the one or more monitoring occasions of the at least one search space can be within a plurality of slots.

In some instances, the physical downlink control channel carrying the power saving downlink control information format can be a group common physical downlink control channel.

In some instances, the physical downlink control channel, which is carrying the power saving downlink control information format can include a cyclic redundancy check scrambled with a radio network temporary identifier, where the radio network temporary identifier can be configured specific to the power saving downlink control information format.

In some instances, the method can further comprise receiving an indication of a starting location of a bit field of the power saving downlink control information format, wherein the bit field is assigned to the user equipment.

In some instances, the power saving downlink control information format can further include an indication of one or more wake-up parameters. In some of these instances, the one or more wake-up parameters can include at least one of a number of monitoring occasions of the physical downlink control channel carrying the power saving downlink control information format to skip, a number of physical downlink control channel monitoring occasions to skip within an ON duration, a drx-onDurationTimer start time offset with respect to a start time of a discontinuous reception cycle, and a drx-onDurationTimer value.

In some instances, the method can further comprise receiving a dynamic indication identifying a number of next monitoring occasions to skip.

In some instances, the discontinuous reception configuration can be received via higher layers through a radio resource control message.

Figure 5:
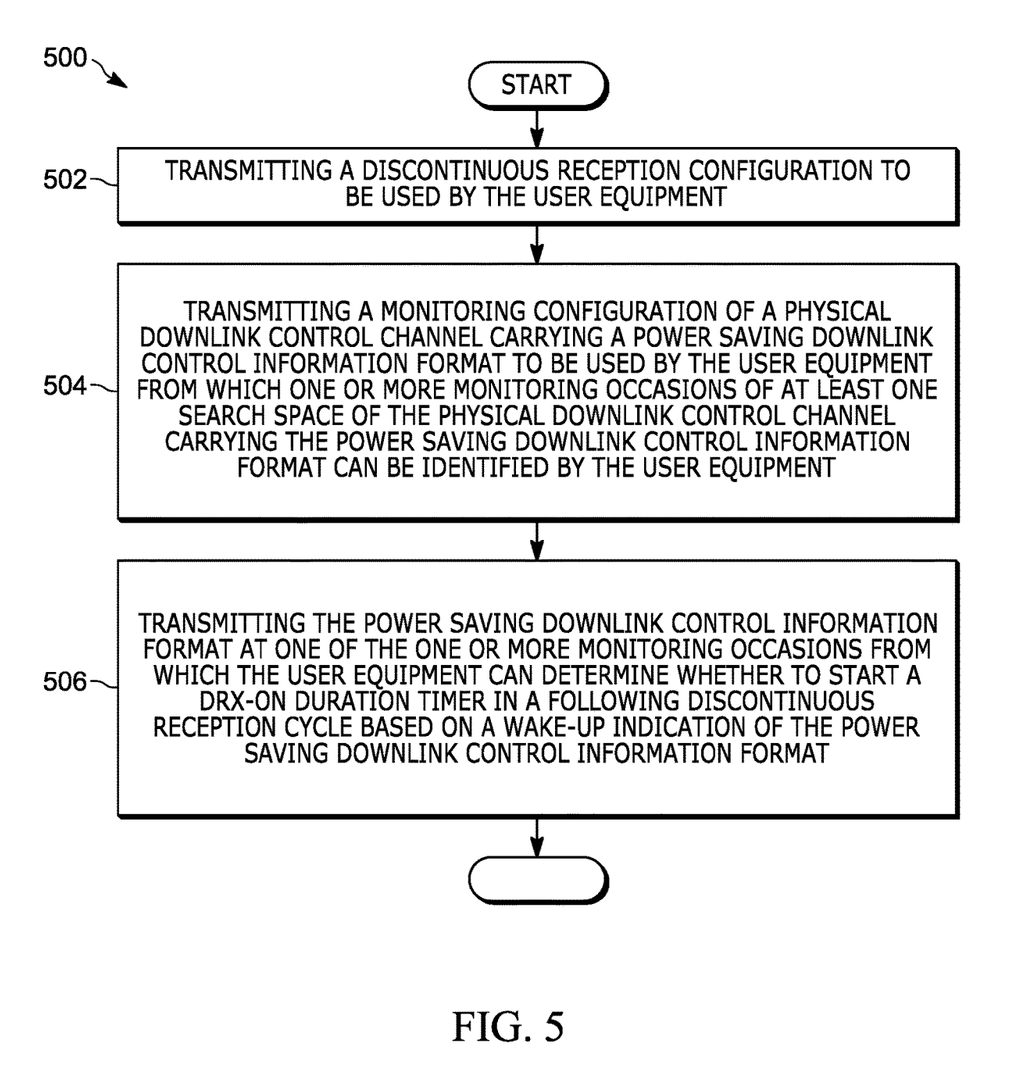
FIG. 5 is a flow diagram in a network entity of providing a discontinuous reception configuration to a user equipment during which at least one of one or more monitoring occasions can be identified during which a power saving downlink control information format may be transmitted.

FIG. 5 illustrates a flow diagram 500 of a method in a network entity of providing a discontinuous reception configuration to a user equipment during which at least one of one or more monitoring occasions can be identified during which a power saving downlink control information format may be transmitted. More specifically, the method includes transmitting 502 a discontinuous reception configuration to be used by the user equipment, and transmitting 504 a monitoring configuration of a physical downlink control channel carrying a power saving downlink control information format to be used by the user equipment from which one or more monitoring occasions of at least one search space of the physical downlink control channel carrying the power saving downlink control information format can be identified by the user equipment. The power saving downlink control information format can be transmitted 506 at one of the one or more monitoring occasions from which the user equipment can determine whether to start a drx-onDurationTimer in a following discontinuous reception cycle based on a wake-up indication of the power saving downlink control information format.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
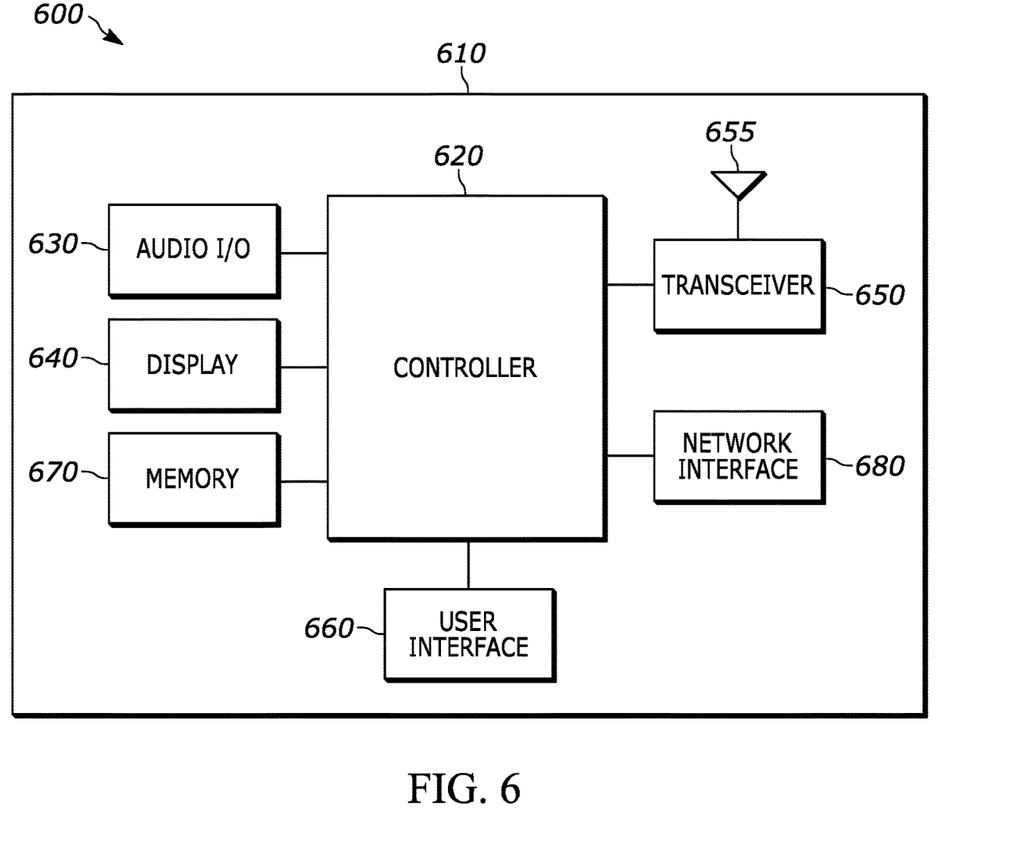
FIG. 6 is an example block diagram of an apparatus according to a possible embodiment.

FIG. 6 is an example block diagram of an apparatus 600, such as the wireless communication device 110, according to a possible embodiment. The apparatus 600 can include a housing 610, a controller 620 within the housing 610, audio input and output circuitry 630 coupled to the controller 620, a display 640 coupled to the controller 620, a transceiver 650 coupled to the controller 620, an antenna 655 coupled to the transceiver 650, a user interface 660 coupled to the controller 620, a memory 670 coupled to the controller 620, and a network interface 680 coupled to the controller 620. The apparatus 600 can perform the methods described in all the embodiments The display 640 can be a viewfinder, a liquid crystal display (LCD), a light emitting diode (LED) display, a plasma display, a projection display, a touch screen, or any other device that displays information. The transceiver 650 can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 670 can include a random access memory, a read only memory, an optical memory, a solid state memory, a flash memory, a removable memory, a hard drive, a cache, or any other memory that can be coupled to an apparatus.

The apparatus 600 or the controller 620 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 670 or elsewhere on the apparatus 600. The apparatus 600 or the controller 620 may also use hardware to implement disclosed operations. For example, the controller 620 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment, the method comprising:
   receiving a discontinuous reception configuration;
   receiving a configuration of a physical downlink control channel carrying a power saving downlink control information format, wherein the configuration includes an offset value with respect to a starting time of a discontinuous reception cycle of the discontinuous reception configuration;
   detecting the power saving downlink control information format at one of one or more monitoring occasions of the physical downlink control channel carrying the power saving downlink control information format; and
   determining whether to start a drx-onDurationTimer in a following discontinuous reception cycle of the discontinuous reception configuration based on a wake-up indication of the power saving downlink control information format,
   wherein the one or more monitoring occasions is determined, based upon the offset value, the starting time of the discontinuous reception cycle, and at least one search space configuration of the physical downlink control channel carrying the power saving downlink control information format.

2. The method in accordance with claim 1, wherein the one or more monitoring occasions of the physical downlink control channel are identified for each of the at least one search space configuration from the configuration of the physical downlink control channel carrying the power saving downlink control information format.

3. The method in accordance with claim 1, wherein the offset value with respect to the starting time of the discontinuous reception cycle of the discontinuous reception configuration is user specific.

4. The method in accordance with claim 1, wherein a search space configuration of the at least one search space configuration includes information of a physical downlink control channel monitoring periodicity, a physical downlink control channel monitoring offset, and one or more physical downlink control channel monitoring symbols within a slot.

5. The method in accordance with claim 4, wherein a start position of a time domain resource of the wake-up indication of the power saving downlink control information format is determined, based upon the offset value, the starting time of discontinuous reception cycle for a discontinuous reception on duration, and the search space configuration.

6. The method in accordance with claim 1, wherein the offset value corresponds to a number of slots.

7. The method in accordance with claim 1, wherein the at least one search space configuration identifies a common search space, which is common to more than one user equipment.

8. The method in accordance with claim 1, wherein the one or more monitoring occasions associated with the at least one search space configuration are within one slot.

9. The method in accordance with claim 1, wherein the one or more monitoring occasions associated with the at least one search space configuration are within a plurality of slots.

10. The method in accordance with claim 1, wherein the physical downlink control channel carrying the power saving downlink control information format is a group common physical downlink control channel.

11. The method in accordance with claim 1, wherein the physical downlink control channel, which is carrying the power saving downlink control information format includes a cyclic redundancy check scrambled with a radio network temporary identifier, where the radio network temporary identifier is configured specific to the power saving downlink control information format.

12. The method in accordance with claim 1, further comprising receiving an indication of a starting location of a bit field of the power saving downlink control information format, wherein the bit field is assigned to the user equipment.

13. The method in accordance with claim 1, wherein the power saving downlink control information format further includes an indication of one or more wake-up parameters.

14. The method in accordance with claim 13, wherein the one or more wake-up parameters include at least one of a number of monitoring occasions of the physical downlink control channel carrying the power saving downlink control information format to skip, a number of physical downlink control channel monitoring occasions to skip within an ON duration, a drx-onDurationTimer start time offset with respect to a start time of a discontinuous reception cycle, and a drx-onDurationTimer value.

15. The method in accordance with claim 1, further comprising receiving a dynamic indication identifying a number of next monitoring occasions to skip.

16. The method in accordance with claim 1, wherein the discontinuous reception configuration is received via higher layers through a radio resource control message.

17. A user equipment in a communication network, the user equipment comprising:
a transceiver that receives a discontinuous reception configuration, and receives a configuration of a physical downlink control channel carrying a power saving downlink control information format, wherein the configuration includes an offset value with respect to a starting time of a discontinuous reception cycle of the discontinuous reception configuration; and
a controller, coupled to the transceiver, that detects the power saving downlink control information format at one of one or more monitoring occasions of the physical downlink control channel carrying the power saving downlink control information format, and determines whether to start a drx-onDurationTimer in a following discontinuous reception cycle of the discontinuous reception configuration based on a wake-up indication of the power saving downlink control information format; and
wherein the one or more monitoring occasions is determined, based upon the offset value, the starting time of the discontinuous reception cycle, and at least one search space configuration of the physical downlink control channel carrying the power saving downlink control information format.

18. The user equipment in accordance with claim 17, wherein a search space configuration of the at least one search space configuration includes information of a physical downlink control channel monitoring periodicity, a physical downlink control channel monitoring offset, and one or more physical downlink control channel monitoring symbols within a slot.

19. The user equipment in accordance with claim 17, wherein the physical downlink control channel carrying the power saving downlink control information format is a group common physical downlink control channel.

20. The user equipment in accordance with claim 17, wherein the transceiver further receives an indication of a starting location of a bit field of the power saving downlink control information format, wherein the bit field is assigned to the user equipment.

* * * * *